(12) United States Patent
Chazallet et al.

(10) Patent No.: US 10,873,699 B2
(45) Date of Patent: Dec. 22, 2020

(54) METHOD AND DEVICE FOR IMAGING A PLANT, AND METHOD FOR DETERMINING A CHARACTERISTIC OF A PLANT

(71) Applicants: ARVALIS INSTITUT DU VEGETAL, Paris (FR); BIOGEMMA, Paris (FR); SHAKTI, Marseilles (FR)

(72) Inventors: Frederic Chazallet, Marseilles (FR); Herve Lassagne, Saint-Sandoux (FR)

(73) Assignees: ARVALIS INSTITUT DU VEGETAL, Paris (FR); BIOGEMMA, Chappes (FR); SHAKTI, Marseilles (FR)

( * ) Notice: Subject to any disclaimer, the term of this patent is extended or adjusted under 35 U.S.C. 154(b) by 0 days.

(21) Appl. No.: 16/622,762

(22) PCT Filed: Jun. 1, 2018

(86) PCT No.: PCT/FR2018/000153
§ 371 (c)(1),
(2) Date: Dec. 13, 2019

(87) PCT Pub. No.: WO2018/229360
PCT Pub. Date: Dec. 20, 2018

(65) Prior Publication Data
US 2020/0162668 A1    May 21, 2020

(30) Foreign Application Priority Data
Jun. 14, 2017   (FR) ..................... 17 55391

(51) Int. Cl.
*H04N 5/232* (2006.01)
*G06T 7/12* (2017.01)
(Continued)

(52) U.S. Cl.
CPC ......... *H04N 5/23229* (2013.01); *A01D 45/02* (2013.01); *A01D 75/00* (2013.01);
(Continued)

(58) Field of Classification Search
None
See application file for complete search history.

(56) References Cited

U.S. PATENT DOCUMENTS

| 3,437,022 A | 4/1969 | Hamonds, Jr. |
| 2009/0046890 A1* | 2/2009 | Hausmann ............ G06T 7/0002 382/100 |

(Continued)

FOREIGN PATENT DOCUMENTS

| DE | 10 2009 055 626 A1 | 5/2011 |
| WO | WO 2013/101806 A1 | 7/2013 |

(Continued)

OTHER PUBLICATIONS

International Search Report dated Sep. 17, 2018 in PCT/FR2018/00153 filed Jun. 1, 2018, 4 pages.

*Primary Examiner* — Heather R Jones
(74) *Attorney, Agent, or Firm* — Oblon, McClelland, Maier & Neustadt, L.L.P.

(57) ABSTRACT

The invention provides a device (10) for acquiring images of a plant, which device comprises:
i) a first structure (60) defining a cavity (33) for receiving a portion to be imaged of the plant, the cavity presenting a longitudinal axis (13) and an opening (65) at one of its ends, the cavity being defined by at least one transparent wall forming a window (12) for observing the portion to be imaged;
ii) a second structure (61) extending around the window (12) and mounted to move in translation along the longitudinal axis (13) relative to the first structure, and comprising:
  hollow reflective optics (11, 19) extending around the window and including a reflecting surface (19) directed towards the longitudinal axis; and
  a plurality of image sensors (18) regularly distributed around the window (12), the field of view (77) of each
(Continued)

sensor including at least a portion of the reflective optics so as to capture images of the portion of the plant that is surrounded by the window, which images are reflected by the reflective optics; and.

iii) an actuator (64) for driving the second structure to move relative to the first structure along the longitudinal axis.

22 Claims, 13 Drawing Sheets

(51) Int. Cl.
| | |
|---|---|
| *G06T 7/11* | (2017.01) |
| *A01D 45/02* | (2006.01) |
| *A01D 75/00* | (2006.01) |
| *G01B 11/245* | (2006.01) |
| *G06T 7/00* | (2017.01) |
| *G06T 17/00* | (2006.01) |
| *H04N 5/225* | (2006.01) |
| *H04N 5/247* | (2006.01) |
| *H04N 5/265* | (2006.01) |

(52) U.S. Cl.
CPC .......... *G01B 11/245* (2013.01); *G06T 7/0004* (2013.01); *G06T 7/11* (2017.01); *G06T 7/12* (2017.01); *G06T 17/00* (2013.01); *H04N 5/2253* (2013.01); *H04N 5/2254* (2013.01); *H04N 5/2256* (2013.01); *H04N 5/23299* (2018.08); *H04N 5/247* (2013.01); *H04N 5/265* (2013.01); *G06T 2207/20221* (2013.01); *G06T 2207/30128* (2013.01); *G06T 2207/30188* (2013.01)

(56) References Cited

U.S. PATENT DOCUMENTS

| | | | |
|---|---|---|---|
| 2012/0061586 A1* | 3/2012 | Yao | G01N 21/6486 250/459.1 |
| 2015/0177067 A1 | 6/2015 | Golgotiu et al. | |
| 2016/0225135 A1* | 8/2016 | Young | G06T 7/90 |
| 2018/0143410 A1* | 5/2018 | Chazallet | G03B 15/00 |
| 2018/0218215 A1* | 8/2018 | Quenard | B07C 5/342 |

FOREIGN PATENT DOCUMENTS

| | | |
|---|---|---|
| WO | WO 2015/086988 A1 | 6/2015 |
| WO | WO 2017/021285 A1 | 2/2017 |

* cited by examiner

METHOD AND DEVICE FOR IMAGING A PLANT, AND METHOD FOR DETERMINING A CHARACTERISTIC OF A PLANT

TECHNICAL FIELD

The present invention relates to a device for taking images of a plant, in particular a device for taking peripheral images of a portion of a plant that is elongate in shape, such as a bunch or an ear, and to methods of taking images of a plant using such a device, and of processing the images.

STATE OF THE ART

It is known to determine the properties of a plant by processing images of the plant.

Concerning an ear of maize, it is important to quantify characteristics such as the number of rows, the number of kernels per row, the number of kernels, the area of the ear of maize, the area of the ear of maize that has been pollinated, and the volume of the ear of maize, in order to characterize the potential yield of a line or of a hybrid, whether or not it is transgenic. Before harvest, estimates of corn yields are generally obtained in particular by measuring the number of ears of maize per acre, the number of rows and the number of kernels per row, and also the specific weight of the kernel. Values such as the size of the kernels, in terms of length, width, and volume can then be taken into consideration. Nevertheless, measuring such characteristics by an operator is laborious and subject to error.

Patent application US2009046890A1 describes a method and a system for analyzing digital images of ears of maize, enabling at least one property of the ear and of the kernels of the maize to be evaluated, and in particular the number and the size of the kernels.

The system includes an image sensor such as a charge coupled device (CCD) camera, which delivers images to image processor means that apply various processing algorithms to the images, such as filtering or searching for outlines, for example.

Nevertheless, taking images of ears placed on a support such as a conveyor does not make a complete image of the ear available, and makes it possible only to estimate properties of the ear and of its kernels.

WO 2013/101806 describes a version of that device for measuring traits of immature ears; in that device likewise, an image of the ear is interpreted; although it is stated that the ear may be on the plant, no technical solution is given describing that embodiment.

Application WO2017021285A1 describes a method and a device for imaging the outside surface of an ear of maize while the ear is dropping through the field of view of an imaging module that has an odd number of image sensors secured to a frame.

From each individual image supplied by each of the sensors, the outline is extracted the portion of the ear as seen by the sensor, and then those outlines are combined with appropriate respective rotations so as to construct a three-dimensional model of the ear.

That device may be used in the laboratory, or it may be combined with a harvester, but it does not enable ears to be measured in situ (on a standing plant). In particular, the volume of that apparatus is limiting in such use.

Such methods and systems for taking images of a plant are not adapted to determining properties of a standing plant from images of the plant.

In order to enable images to be taken of the peripheral surface of a plant with some minimum spacing distance between the plant and the image-taking apparatus, application WO2015086988 describes a portable device for taking images of objects, the device including a transparent elongate window adapted to surround the plant, hollow reflective optics extending around the window with its reflective surface(s) being directed towards the longitudinal axis of the window, and one or more sensors for sensing images of portions of the plant, which images are reflected by the reflective surface(s) substantially parallel to the longitudinal axis. That application WO2015086988 proposes constructing a 3D model stereoscopically.

In order to obtain images of the entire periphery of an elongate plant that is stationary, the image-taking device is moved along the plant and successive images are taken during this movement, after which these images of adjacent longitudinal portions (i.e. "slices") of the plant are connected together in pairs.

Thus, in order to obtain a faithful image of the outside surface of the plant, it is necessary for this movement to be, as exactly as possible: rectilinear; along the longitudinal axis of the plant; and regular (i.e. at constant speed).

Using that device in the field for characterizing an ear of maize thus depends on the regularity of hand movements, which can be difficult because of the weight of the device and because of the possibility that the standing ear might move. Irregularity in the movement can be corrected by making use of an accelerometer, which can measure the insertion speed and correct the assembly of the image accordingly, however that solution is hardly compatible with signal processing that is fast enough to enable the user to be informed quickly about the characteristics of the ear being studied. Furthermore, as a result of the irregularity of ears and of the insertion movement, the ear may come into contact with the wall of the device, with the processing of the resulting images being made that much more complicated.

Furthermore, constructing a three-dimensional model of an ear from images of the ear is made difficult by the absence of characteristic points in the images and by the substantially periodic nature of the images.

There therefore remains a need to provide a device that is capable of taking an image of an ear of maize in situ, and that is lightweight, compact, associated with fast image analysis, and easily transportable from one parcel to another.

There also remains a need to propose a method of processing images of a plant, such as an ear of maize, and that is effective in enabling a characteristic of the plant to be determined, in particular the number of kernels on the ear.

SUMMARY OF THE INVENTION

An object of the invention is to propose a method and a device for taking images of an article, which article may in particular be a plant, and in particular a method and a device for taking images of the periphery of a plant of elongate shape, which method and device are improved and/or remedy, at least in part, the shortcomings or drawbacks of known methods and devices for taking images of an article.

Another object of the invention is to propose a method of determining a characteristic of a plant from images of the outside surface of the plant, which method is improved and/or remedies, at least in part, the shortcomings or drawbacks of known methods.

Unless explicitly or implicitly stated to the contrary, the term "plant" is used below to designate a portion of a standing plant that is to be imaged. Nevertheless, the invention is not limited in any way to standing plants only.

In an aspect of the invention, there is provided a method of taking images of a plant, comprising:
  surrounding a portion to be imaged of the plant with at least one transparent wall forming a window presenting a longitudinal axis and enabling the portion of the plant to be observed through the window;
  placing around the window at least one reflecting surface directed towards the longitudinal axis, i.e. for which a vector normal to the reflecting surface is directed towards the longitudinal axis, together with at least one sensor of images of the plant as reflected by the reflecting surface(s);
  capturing at least a first image of at least a first peripheral portion of the plant, which image is reflected by the reflecting surface(s) substantially parallel to the longitudinal axis;
  moving the reflecting surface(s) and the image sensor(s) relative to the window along the longitudinal axis;
  capturing at least a second image of at least a second peripheral portion of the plant, which image is reflected by the reflecting surface(s) substantially parallel to the longitudinal axis; and
  forming an image of a peripheral portion of the plant from the first image and from the second image.

The invention thus makes it possible to obtain images of the outside surface of the plant as imaged through the window without moving the device as a whole, thereby making it easier to combine the images taken in succession so as to form an image of the complete outside surface of the plant, which image is accurate and makes it possible to determine accurately the properties of the plant from the images.

By way of example, the number of images taken during a complete movement stroke of the reflecting surface(s) and of the image sensor(s) along the window may be of the order of three up to one or more tens.

The images taken correspond to a corresponding number of portions or zones of the outside surface of the plant that are adjacent (or substantially adjacent) in pairs, which adjacent zones or portions preferably overlap partially in pairs, as do the corresponding images.

In preferred implementations of this method:
  images of the plant are captured while the reflecting surface(s) and of the image sensor(s) are moving, i.e. without interrupting the movement, thereby contributing to taking the images more quickly;
  during at least a fraction of the time each image is being taken, the plant is illuminated by a light pulse produced by at least one light source (which may be movable), thereby contributing to limiting the influence of ambient light;
  the ratio of the length of time between two successive light pulses to the duration of each light pulse is greater than 1, in particular lies in a range extending from approximately 10 to approximately 1000, such that the sensor(s) move(s) very little during each light pulse, thereby contributing to improving the quality of the resulting images;
  the reflecting surface(s) and the image sensor(s) are caused to move in translation an axis parallel to the longitudinal axis;
  the reflecting surface(s) and the image sensor(s) are caused to move at a speed that is substantially constant;
  image acquisition is controlled synchronously with the movement of the reflecting surface(s) and of the image sensor(s) along the window;
  the reflecting surface(s), the image sensor(s), and where applicable the light source(s), are secured to at least one movable support that is common to the reflecting surface(s) and to the image sensor(s), which support is moved (by an actuator) relative to the window, along the longitudinal axis, so as to avoid varying the relative position between the reflecting surface(s) and the image sensor(s).

In order to perform these methods, it is possible to use any one of the device s described below.

In another aspect of the invention, there is provided a device for acquiring images of a plant, the device comprising:
  a window for observing the plant (substantially radially), which window presents a longitudinal axis and is arranged to receive, to cover, and/or to surround a portion to be imaged of the plant;
  hollow reflective optics extending around the window and including at least one reflecting surface directed towards the longitudinal axis;
  at least one image sensor arranged outside (and/or around) the window, having a field of view that includes the reflecting surface, so as to capture images of the plant portion that is surrounded by the window, which images are reflected by the reflecting surface(s) substantially parallel to the longitudinal axis when the reflective optics are arranged around the plant portion;
  at least one support for the sensor(s) and for the reflective optics, which support extends outside (and/or around) the window and is mounted to be movable relative to the window; and
  an actuator arranged to drive movement of the support along the longitudinal axis (relative to the window).

In other words, and in another aspect of the invention, there is provided a device for acquiring images of a plant, the device comprising:
  i) a first structure defining a cavity for receiving a portion to be imaged of the plant, the cavity being elongate along a longitudinal axis and presenting an opening at at least one of its two longitudinal ends for inserting the plant portion to be imaged into the cavity, the cavity being defined by at least one transparent wall (of the structure) forming a window for observing (substantially radially) the plant portion to be imaged;
  ii) a second structure extending around the window and mounted to move relative to the first structure in translation along the longitudinal axis of the cavity, the second structure comprising (and supporting):
    hollow reflective optics extending around the window and including at least one reflecting surface directed towards the longitudinal axis;
    a plurality of (substantially identical) image sensors substantially regularly distributed around the window, the field of view of each sensor including at least a portion of the reflective optics so as to capture (substantially radial) images of the portion of the plant that is surrounded by the window, which images are reflected by the reflective optics; and
  iii) an actuator arranged to drive the second structure to move relative to the first structure along the longitudinal axis.

In embodiments of the device:
  the reflective optics include a respective reflecting surface associated with each image sensor;

the or each reflecting surface intersects (i.e. extends across) the optical axis of the or one of the image sensors; in particular the intersection between the optical axis and the reflecting surface may be close to the center of the surface (i.e. substantially coincides therewidth);

the device includes at least one light source associated with each image sensor, which source is secured to the second structure and is arranged to produce light flux directed towards the reflecting surface associated with the sensor, in particular light flux propagating substantially parallel to the optical axis of the image sensor, and/or substantially parallel to the longitudinal axis of the window and of the cavity;

the device includes a plurality of movable assemblies for (substantially radial) imaging, each comprising said reflecting surface, said image sensor with its field of view including the reflecting surface, and said light source, if any;

the number of image sensors and/or of imaging assemblies preferably lies in a range extending from about four up to about twelve or sixteen;

the light source(s) is/are secured to the movable support (and/or the second structure);

the optical axis of the (or each) image sensor is substantially parallel to the longitudinal axis of the window;

the device includes guide members secured to the first structure and arranged to guide the second structure while it is moving;

the device includes a processor unit for processing image data and/or signals delivered by the image sensor(s), which unit is secured to the window and the first structure (i.e. is stationary relative thereto), thereby contributing to limiting the weight of the moving equipment; also to this purpose, it is possible to power the sensor(s) and the or each light source, if any, by a power supply unit secured to the window and the first structure (i.e. is stationary relative thereto);

data or signals may be transmitted from the sensors to the processor unit via an easily-deformable wired link such as a ribbon cable connecting the image sensor(s) to the processor unit, or via a wireless link such as a radio link or an optical link;

the sensor(s) and the or each light source may also be powered by a deformable wired link connecting the sensor(s) and/or the source(s) to the power supply unit, or via a (wireless) induction link;

the or each reflecting surface is inclined relative to the longitudinal axis (and generally relative to the optical axis of the image sensor associated with the reflecting surface) at an acute angle of inclination that is preferably distinct from and close to 45 degrees, in particular at an angle of inclination lying in a range from approximately 30 degrees or 35 degrees to approximately 40 degrees or 44 degrees, or else lying in a range extending from approximately 46 degrees or approximately 50 degrees to approximately 55 degrees or approximately 60 degrees, thereby contributing to reducing the propagation of interfering light towards the image sensor(s);

the or each reflecting surface is curved (convex), and in particular cylindrical, thereby making it possible to obtain an image of a complete longitudinal portion (slice) of the plant (including its outer margins) received in the cavity, even when the plant is in contact with the inside face of the window, thus making it possible to improve the compactness of the device;

the device includes an opaque (first) screen extending around the reflective optics, so as to form a background for the image sensor (s) that contrasts with the plant and that contributes to limiting the influence of the ambient light;

the first screen may be secured to the movable support (and/or to the second structure);

the device includes a (second) screen extending around and along the window, from the image sensor(s), over a length that is shorter than the distance between the sensor and the reflecting surface associated with the sensor, the second screen being secured to the movable support (and/or to the second structure) so as to reduce the propagation of interfering light towards the image sensor(s), in particular interfering light resulting from reflection(s) of the flux produced by the light source(s).

A data processor unit of the device may be programmed to perform a method of determining a characteristic of a plant as described below.

In another aspect of the invention, there is provided a method of determining a characteristic of plant, wherein initial images are acquired of neighboring zones of the outside surface of the plant, which images are respectively acquired from a plurality of viewpoints by a plurality of sensors of an imaging device including an optical device (including at least one lens) associated with each sensor, the neighboring zones overlapping partially in pairs; which method includes the following operations:

a) segmenting the initial images in order to conserve a (single) zone of interest from each initial image, so as to obtain a segmented image from each initial image;

b) for each segmented image:

b1) for each pixel of at least one significant subset of pixels in the segmented image, in particular for each pixel of the segmented image or else for every second. (or every third) pixel, calculating the coordinates of the point of a three-dimensional model of the plant made up of developable surfaces, which point is the image of the pixel taken by the optical device;

b2) flattening the segmented image as a function of the coordinates calculated for each pixel of the segmented image so as to obtain a developed image;

c) assembling together the developed images so as to obtain an assembled image, where assembling together ("stitching") the developed images may include blending together the developed images; and d) determining the characteristic from the assembled image or from the developed images.

in preferred implementations of this method:

for each segmented image, and for each pixel of the segmented image, a quality indicator for the pixel is calculated, which indicator varies as a function of the viewing angle at which the point of the model of the plant that is the image of the pixel is seen by the optical device, and wherein the quality indicator is used for blending together the developed images;

the quality indicator corresponds substantially to the angle of inclination relative to the normal to the surface of the model, at the image point of the pixel under consideration, for the ray coming from the image point of the pixel under consideration and terminating at the pixel under consideration;

determining the characteristic comprises segmenting the assembled image or the developed images so as to obtain closed outlines, thus making it possible to calculate the center of gravity of each closed outline presenting elongation that is less than a determined value;

segmenting the assembled image or the developed images includes converting the image(s) into black and white;

segmenting the assembled image or the developed images may include a global thresholding operation, or preferably a local thresholding operation;

closed outlines are selected from the closed outlines obtained by segmentation of the assembled image or the developed images, the outlines that are selected having at least one morphological parameter such as the elongation of the outline, the convexity of the outline, or the area defined by the outline, that satisfies a determined selection criterion, in particular outlines for which elongation is less than a determined value; when the plant is an ear, the number of closed outlines that are selected is a reliable estimate of the numb of kernels of the ear;

calculating the center of gravity of each of the closed outlines as selected in this way; for example, this makes it possible to determine the number of rows of an ear, or to determine whether the ear has a kernel structure that is regular, and to deduce therefrom the zones that have been pollinated correctly (presence of kernels or kernels in formation) and the zones where the kernels have not been pollinated or have aborted;

determining the developable surfaces of the model, in particular cylinders or truncated cones, on the basis of the segmented images resulting from initial images acquired by a plurality of sensors, in particular by all of the sensors, in particular by cross-referencing outline information contained in the segmented images.

In other aspects of the invention, there are provided:

a data processor system including means for performing a method of determining a characteristic of a plant as described in the present application;

a program including instructions that, when the program is executed by a data processor unit such as a computer, cause the processor unit to perform the method of determining a characteristic of a plant as described in the present application; and a computer-readable data medium storing said program.

Other aspects, characteristics, and advantages of invention appear from the following description, which refers to the accompanying figures showing preferred embodiments of the invention without any limiting character.

BRIEF DESCRIPTION OF THE FIGURES

FIG. 9 is an image of an angular sector of a "slice" of an ear of maize as acquired by an image sensor;

FIG. 10 is an image obtained by segmenting the image of FIG. 9;

FIG. 11 is a (flattened) image of a longitudinal strip of an ear of maize as can be obtained by assembling together images such as the image shown in FIG. 10, once they have been flattened;

FIG. 12 is an image obtained by segmenting the image of FIG. 11 in such a manner as to include both the outlines of kernels identified by segmentation, and also their respective centers of gravity;

FIG. 13 is a (flattened) image of the entire outside surface of an ear of maize as can be obtained by assembling together images of the kind shown in FIG. 11; and FIG. 14 is an image obtained by segmenting the image of FIG. 13 in such a manner as to include both the outlines of kernels identified by segmentation, and also their respective centers of gravity.

FIG. 15 corresponds to processing an image of the entire ear as reconstituted, and FIG. 16 corresponds to processing a plurality of images of vertical portions of the ear.

DETAILED DESCRIPTION OF THE INVENTION

Figure 1:
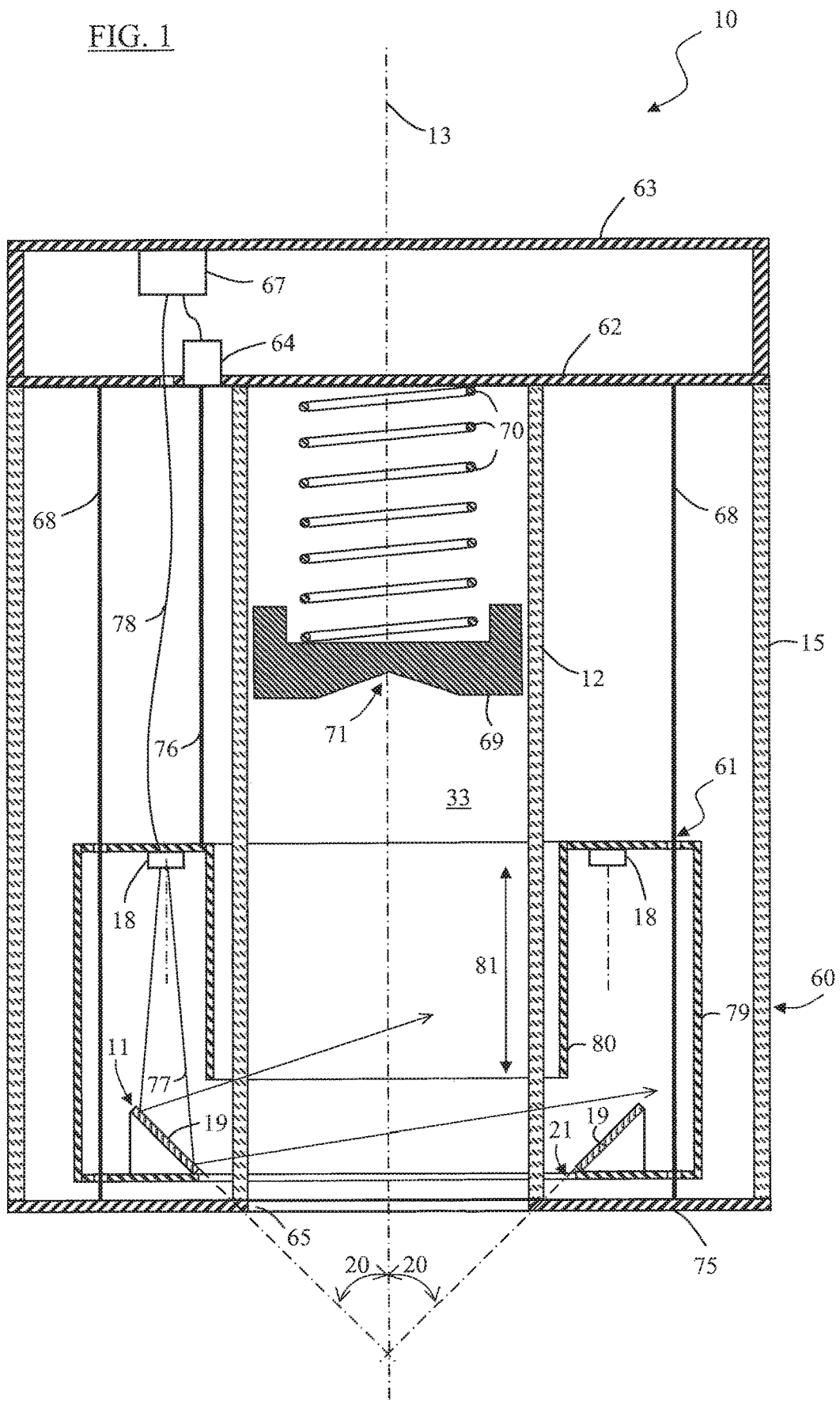
FIG. 1 shows diagrammatically an image-taking device in longitudinal section view on a plane containing the axis of symmetry of the reflective optics of the device and of the cavity for receiving a plant that is to be imaged, in a first configuration in which the reflective optics are situated in the proximity of the inlet opening into the cavity.

Unless specified explicitly or implicitly to the contrary, elements or members that are structurally or functionally identical or similar are given identical references in the various figures.

When improving plants and producing seeds, the phenotype characteristics associated with the ear or with the kernel need simultaneously to be taken at a high rate in order to address a large number of plants compatible with such programs, and to comprise data of high quality.

When selecting varieties, complex characteristics such as yield can be broken down into yield components. With reference to an ear, these components are the number of kernels per ear, the dimensions of the kernels in terms of length, width, and volume, the overall volume of the ear, the number of rows, and the number of kernels per row. Analyzing these components on an ear of maize can make it possible to select ears when performing variety selection. Nevertheless, these elements can be counted only manually and mainly on ears that have been harvested and shelled, which requires a large amount of manipulation.

Analyzing these elements is also important for early evaluation of transgenic plants.

Analyzing an ear by imaging plants serves also to see the portions of the ear that have been pollinated and those that have not been pollinated, which characteristic is of particular importance, e.g. if it is desired to evaluate the tolerance of a plant to an abiotic stress such as drought, where kernel abortion is a major marker for such stress. Taking images of ears in the field can also be a tool for tracking disease and for characterizing the tolerance of the material to abiotic stresses (Fusarium verticiloides, Fusarium monoliforme, etc.).

In nonexhaustive manner, once a component of the ear or of the kernel has been measured, the resulting information can be used in numerous applications. These applications may be identifying characteristics of interest in genetic resources, making use of these characteristics in a selection program, whether on a line or on a hybrid, viewing the effectiveness of a program for multiplying seeds, etc.

Finally, when producing seeds or kernels, the pollination value serves to forecast production, and for example to assist in predicting harvesting dates and expected volumes. Earlier observation of this criterion can make it possible to forecast the harvest and to plan harvesting: volumes, harvesting dates, variation in drying requirements.

When producing maize kernels, early evaluation of kernel values such as the number of kernels, the color, and the size of the kernels, serves to evaluate the quality of the harvest, which value is important not only in producing maize kernels, but also in producing maize forage, where this value is likewise an indicator of the value of the crop, and enables a nutritional value to be evaluated, and for example to set the harvest price. Measuring maize ear characteristics is of agronomic interest, in particular if measurements are taken in situ, before harvest. The device described by the invention enables such measurements to be taken on standing plants after removing or folding back the husk or "shuck" covering the ear, and may advantageously be coupled with a georeferencing system to enable the operator to have data about ears including knowledge of their exact positions, in particular when measurements are taken on plants that are selected at random over a parcel, and also enables results from the plant under evaluation to be reconciled directly in the context of a specific experimental design.

When looking for particular characteristics, such as the presence of symptoms associated with a disease, in particular on the shuck, the device may also be used on an ear without folding back the shuck.

With reference to FIGS. 1 to 4 in particular, the image-taking device 10 has a reflective optical system 11 that is pierced by a central recess 21 and that extends around an internal window 12.

The optical system 11 is surrounded by an external window 15.

The windows 12 and 15 may be made of a transparent material such as glass or some lighter material. Alternatively, the external window 15 may be opaque.

The windows 12 and 15 are generally tubular in shape, in particular they are in the form of cylinders of circular section, about an axis 13 forming the longitudinal axis and the general axis of symmetry of the device 10.

The windows 12 and 15 form portions of the first structure 60 of the device, which structure 60 also has a wall 62 that is secured to the windows, extending from, and shutting, the top ends of the windows, and supporting an actuator 64 such as a stepper motor.

The window 12 and the wall 62 thus define a (tubular) cylindrical cavity 33 that is open at its bottom end 65, presenting a shape that is elongate along a longitudinal axis 13, with a height (as measured along the axis 13) and a cross-section that are matched to the plant portion to be imaged, since it is to be inserted into this cavity for that purpose.

Thus, the walls 12, 62 of the device 10 are designed to cover and surround an entire ear of a standing plant, with the stalk that supports the ear passing through the opening 65 and under the device.

The optics 11 are made up of eight identical mirrors having their respective reflecting surfaces 19 sloping relative to the axis 13 at an acute angle 20 that is common to all of the surfaces 19, and substantially equal to 50 degrees, for example, and they face upwards (cf. FIGS. 1 to 3) and towards the axis 13 of the device 10.

The optics 11 form part of the second structure 61 of the device, extending around the window 12 and mounted to be movable in translation along the longitudinal axis 13 relative to the first structure 60.

The structure 61 also has eight identical imagers, each including an image sensor 18 and a lens (reference 14, FIG. 8) having an optical axis 66 parallel to the axis 13.

The image sensors 18, which may be matrix sensors made of complementary metal oxide semiconductor (CMOS) technology, are fastened to an annular wall 72 and, like the surfaces 19, they are arranged in regularly distributed manner around the window 12 and the axis 13.

The reflective optics thus include a respective reflecting surface 19 associated with each image sensor.

Figure 3:
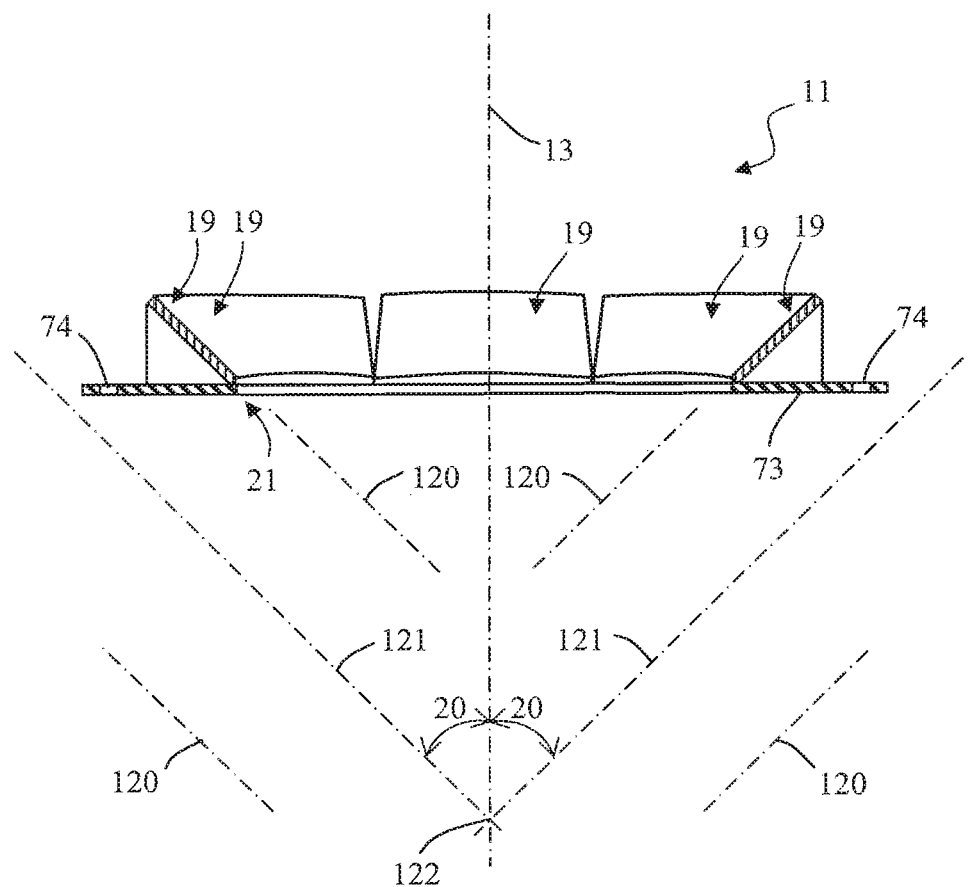
FIG. 3 shows diagrammatically reflective optics of the kind used in the device shown in FIGS. 1 and 2, in longitudinal section, together with the support therefor.

As shown in FIG. 3, each surface 19 is curved (convex), these surfaces extending along cylinders 120 of circular section with respective longitudinal axes 121 coinciding at a common point 122 on the axis 13.

Figure 2:
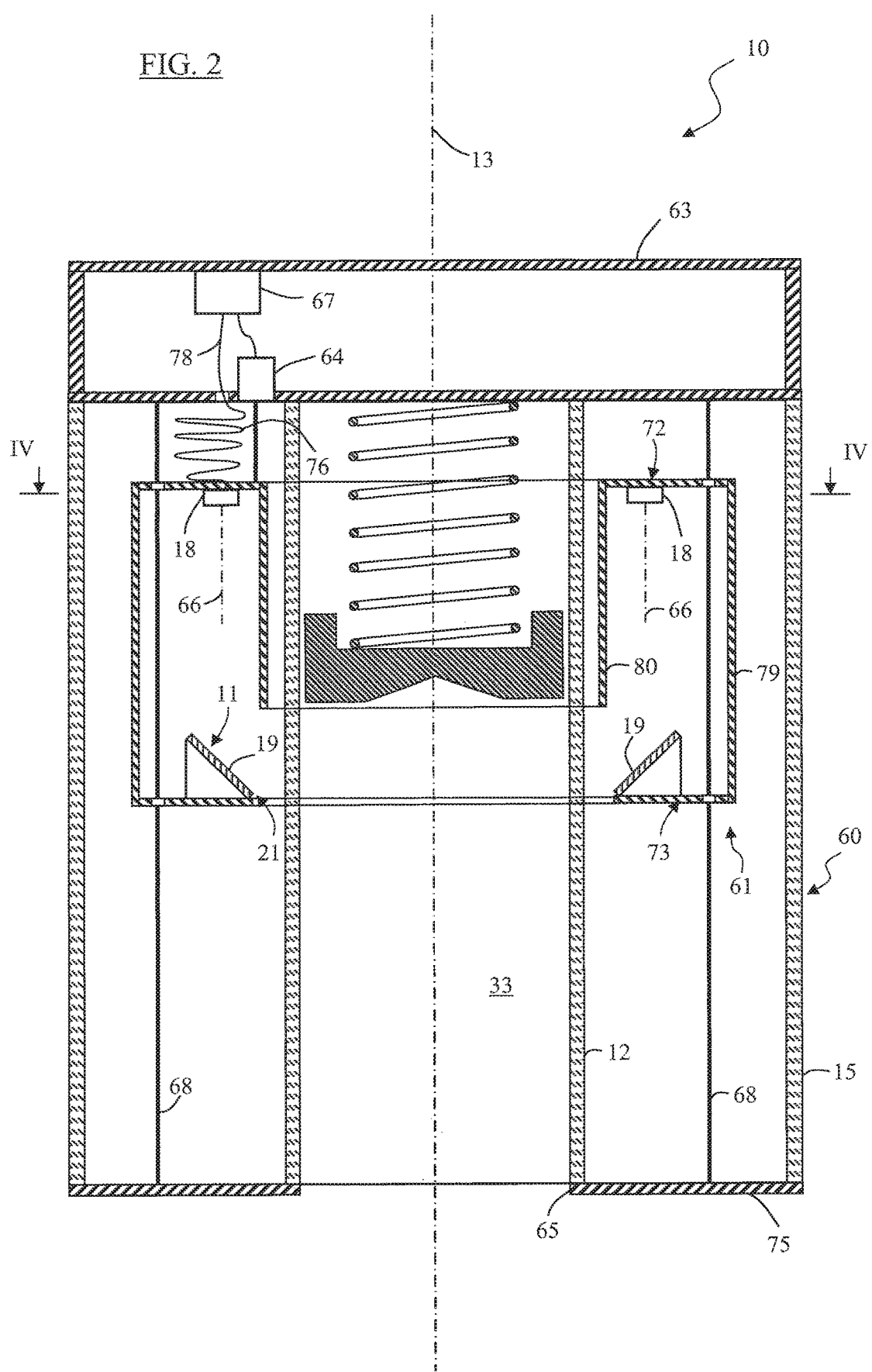
FIG. 2 shows diagrammatically the device shown in FIG. 1, in the same longitudinal section view, in a second configuration in which the reflective optics is situated at a distance from the inlet opening into the cavity.

As shown in FIGS. 1 and 2, the intersection between the optical axis 66 of a sensor 18 and the associated reflecting surface 19 coincides substantially with the center of that surface.

As shown in FIG. 1, the field of view 77 of each sensor includes at least a portion of the reflective optics so as to capture images of an angular portion (or sector) of a horizontal section of the plant portion surrounded by the window 12, as reflected by the reflective optics.

The positioning of the device 10 around the ear for imaging is performed in such a manner that the ear extends substantially along the axis of symmetry 13 of the optics 11 and of the cavity 33, so that the various portions of the peripheral surface of the ear are situated at substantially the same distance from the window 12, and consequently from the surfaces 19 of the optics 11.

For this purpose, it is possible, inside the cavity 33, to provide a guide 69 for the "free" end of the ear, i.e. its top end, as shown in FIG. 1, The guide 69 is mounted to slide in the cavity 33 along the axis 13, and its top portion bears against a spring 70 secured to the wall 62, The bottom face of the guide 69, against which the end of the ear can bear, includes a central depression 71 serving to center the top end of the ear in the cavity 33.

The ear is also positioned in the bottom portion of the cavity 33 so as to extend above the recess 21 of the optics 11 when the optics 11 and the second structure 61 are in the "low" end-of-stroke position, substantially as shown in FIG.

1, and is positioned to extend below the recess 21 of the optics 11 when the optics 11 and the second structure 61 are in the "high." end-of-stroke position, substantially as shown in FIG. 2, such that the optics 11 scan the entire outside surface of the ear during a cycle of moving the second structure 61 relative to the first structure 60.

The first structure also has guides 68 serving to guide the second structure as it moves, which guides are secured to the wall 62 and to a transverse annular wall 75 connecting together the respective bottom ends of the walls 12 and 15.

The guides 68 extend parallel to the axis 13 and they pass through respective openings 74 provided in the two walls 72, 73 forming parts of the second structure, each wall being annular in shape.

The actuator 64 is fastened to the first structure 60 and is arranged to drive the second structure 61 in (reciprocating) translation along the axis 13 relative to the first structure by means of a motion transmission member 76, such as a cog belt.

The first structure includes a processor unit 67 for processing image data delivered by the image sensors 18, and the device includes ribbon cables 78 connecting the sensors to the unit 67 for the purpose of transmitting data from the sensors to the processor unit.

The data processor unit may be connected to a display interface, which may be integrated in the portable device 10, so that an operator carrying the device can view the results of measuring and processing images by looking at the interface. If a geolocation system is associated with the device, the geographical position of the measurement is also available.

Figure 4:
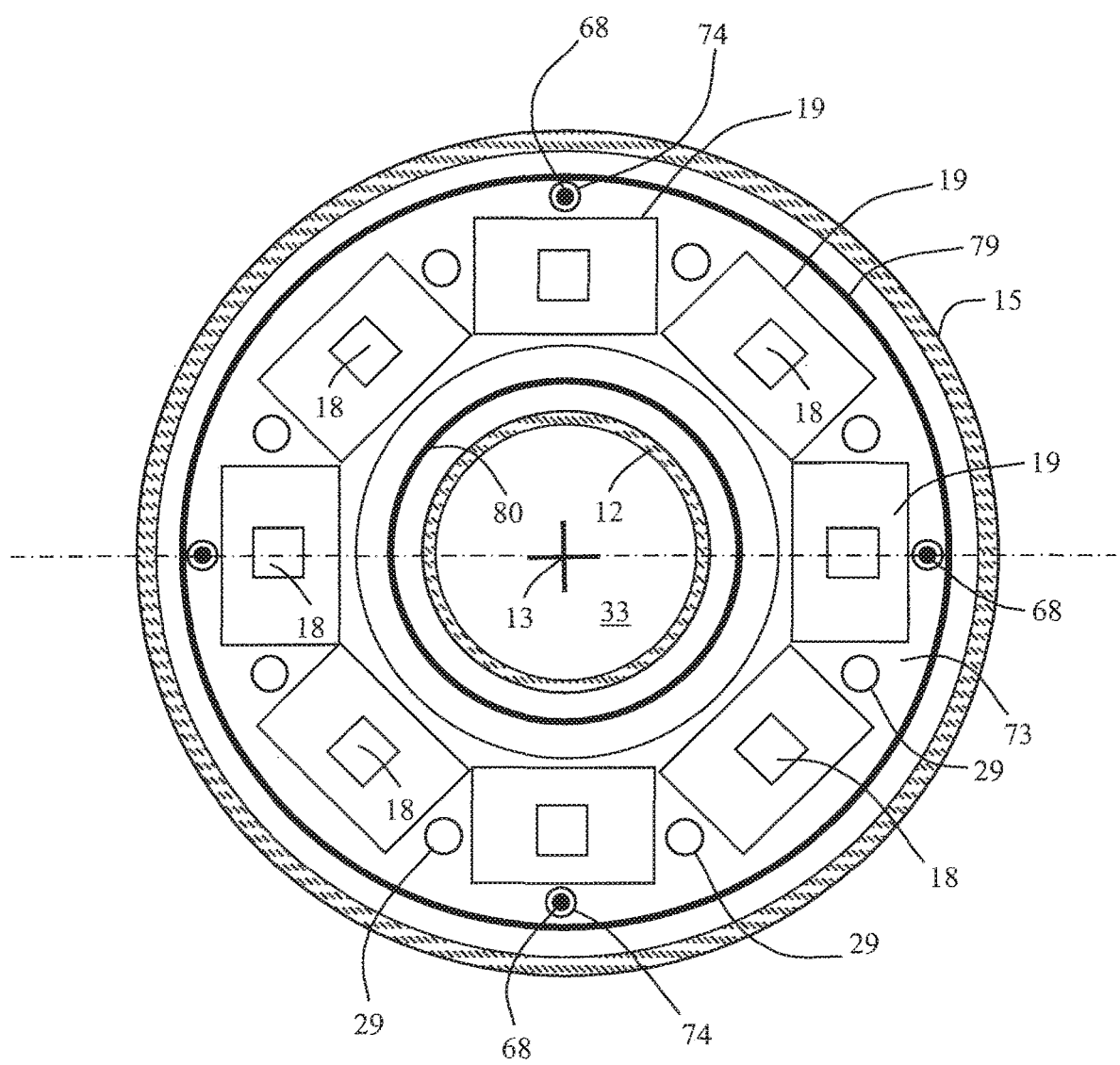
FIG. 4 shows diagrammatically a portion of the image-taking device shown in FIGS. 1 and 2, in a cross-section view, and it is a view on IV-IV of FIG. 2.

As shown in FIGS. 1, 2, and 4, the movable structure also includes two cylindrical screens that are coaxial about the axis 13: a first screen 79 extends around the reflective optics and forms a background for the image sensors; and a second screen 80 extends around and along the window 12, starting from the image sensors 18, which extend around the screen, and over a length 81 (FIG. 1) that is less that the distance between each sensor and the reflecting surface with which it is associated, so as to reduce interfering light.

The movable structure 61 includes a respective light source 29 associated with each sensor 18, each of which light sources is fastened to the support 72 that is common to the sensors 18 and is arranged so as to produce a light beam that is directed towards the reflecting surface associated with the sensor, propagating parallel to the optical axis of the image sensor and parallel to the longitudinal axis 13, so as to illuminate a portion to be imaged of a part of the surface of the ear, by the light beam being reflected on the surface 19.

The light beam produced by the light source(s) may present a light spectrum that is "white" or "yellow".

The portable device 10 may also include a data storage unit connected to the processor unit 67 and arranged to store data delivered by the processor unit, together with a battery arranged to power the actuator 64, the sensors 18, the sources 29, the unit 67, and the data storage unit.

Figure 5:
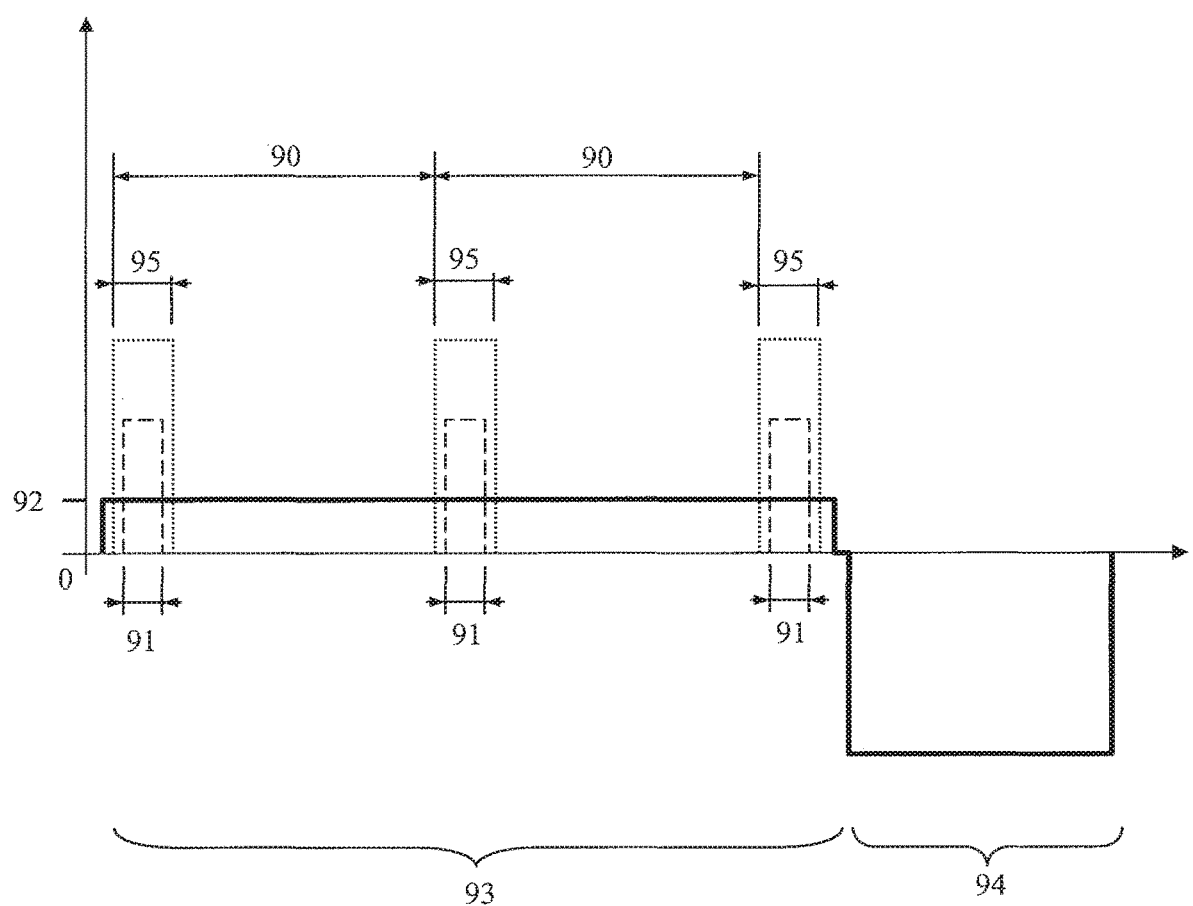
FIG. 5 is a timing chart showing diagrammatically variations in the travel speed of the second structure of a device of the kind shown in FIGS. 1, 2, and 4, relative to the first structure of the device during a travel cycle, and showing the image-taking and lighting operations during this cycle.
Figure 6:
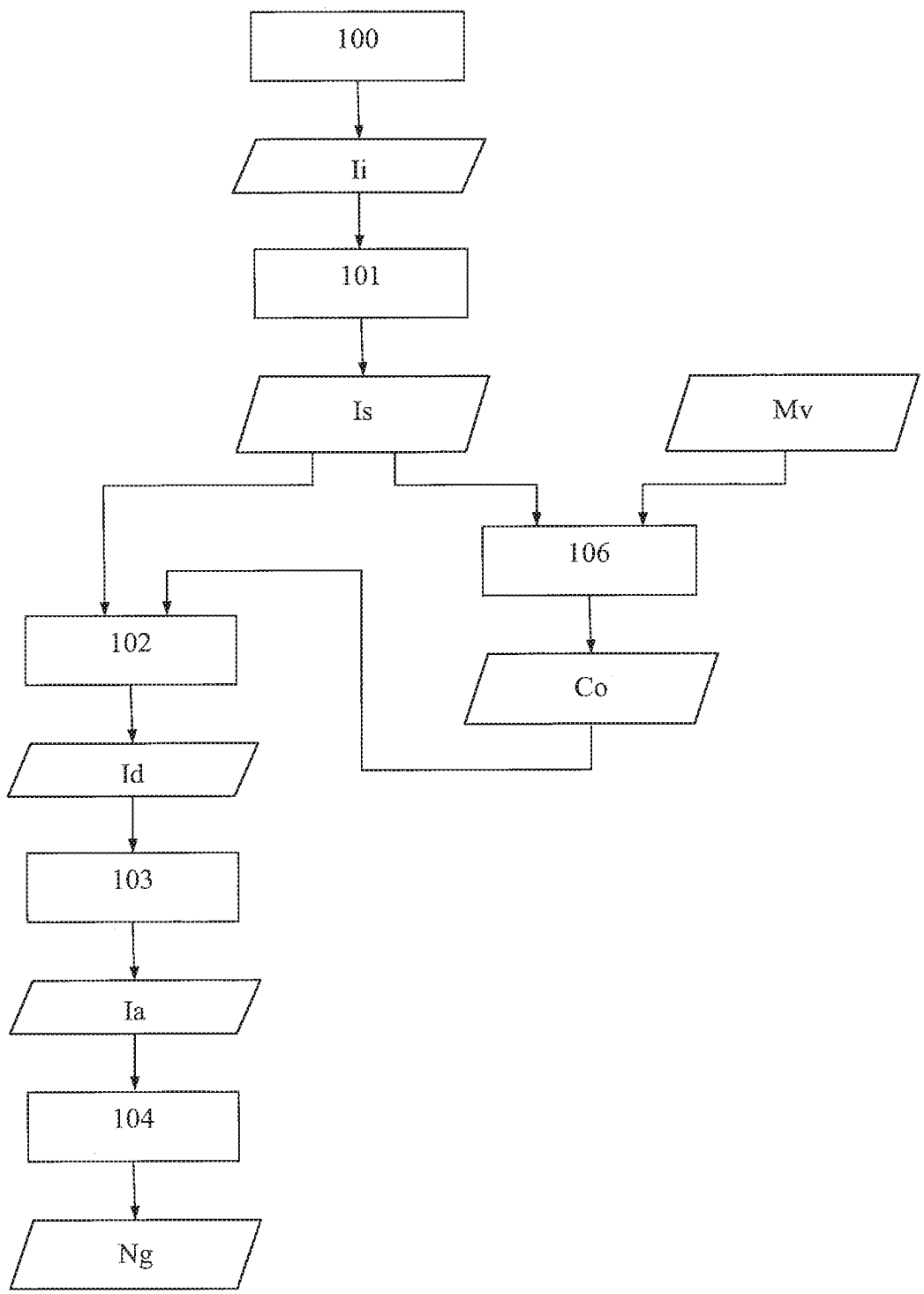
FIGS. 6 and 7 are flow charts of methods for determining a characteristic of a plant using a device of the kind shown in FIGS. 1 to 3.

In FIG. 5, the timing plotted as a bold and continuous line represents the speed of the structure 61; the timing plotted as a fine dotted line represents the (simultaneous) activation of the light sources 29; and the timing plotted as a fine dashed line represents the (simultaneous) taking of an image by each of the sensors 18.

After the device has been positioned around an ear, as described above, with the movable structure 61 in its low end-of-stroke position as shown in FIG. 1, the unit 67 can cause the actuator 64 to operate so as to move the structure 61, the light sources 29, and the sensors 18 so as to proceed with taking images of the ear, in the manner shown in FIG. 5:

the actuator is operated to move the structure 61 upwards at a constant speed 92, which may be in the range 1 centimeter per second (cm/s) to 100 cm/s, for example, in order to perform a "go" stroke 93, until the movable structure 61 reaches the high end-of-stroke position shown in FIG. 2; this results in the reflecting surfaces 19, the surfaces 29, and the sensors 18 moving along the axis 13 relative to the window 12;

during this stroke, the unit 67 causes operation of the sources 29 and capture of images of the ear as reflected by the surfaces 19 during operation of the sources, with this being done on three occasions in the example shown in FIG. 5; by way of example, the image exposure time, referenced 91, may be in the range one millisecond (ms) to several milliseconds, and the length of time that elapses between taking two successive images, referenced 90, may for example lie in the range 100 ms to 1 second (s); each image may be taken entirely while a light pulse is being produced by the sources 29, and the duration 95 of the light pulse may likewise lie in the range 1 ms to several milliseconds, with this duration then being slightly longer than the image exposure time 91, as shown in FIG. 5; in an alternative (not shown), the taking of each image may start during a light pulse and may continue after the end of that pulse; under such circumstances, it is important for the light pulse to be bright enough to ensure that the light flux received by each sensor during the light pulse is much greater than the light flux received by the sensor after the end of the pulse (e.g. 100 times greater); image acquisition may be controlled by the control and data processing unit 67, synchronously with the movement of the movable structure 61;

the speed 92 is selected in such a manner that, for each sensor 18, the three images that are taken in succession are images of three respective neighboring zones (referred to as "slices" or "sections") of the outside surface of the ear that overlap partially in pairs; and movement of the structure 61 is stopped at the "high" end-of-stroke position, and then the actuator 64 is controlled so as to cause the structure 61 to move in the opposite direction along a "return" stroke 94 until it returns to its starting position.

In other manners of proceeding, image acquisitions may be performed while the movable structure is moving up and/or down.

Figure 8:
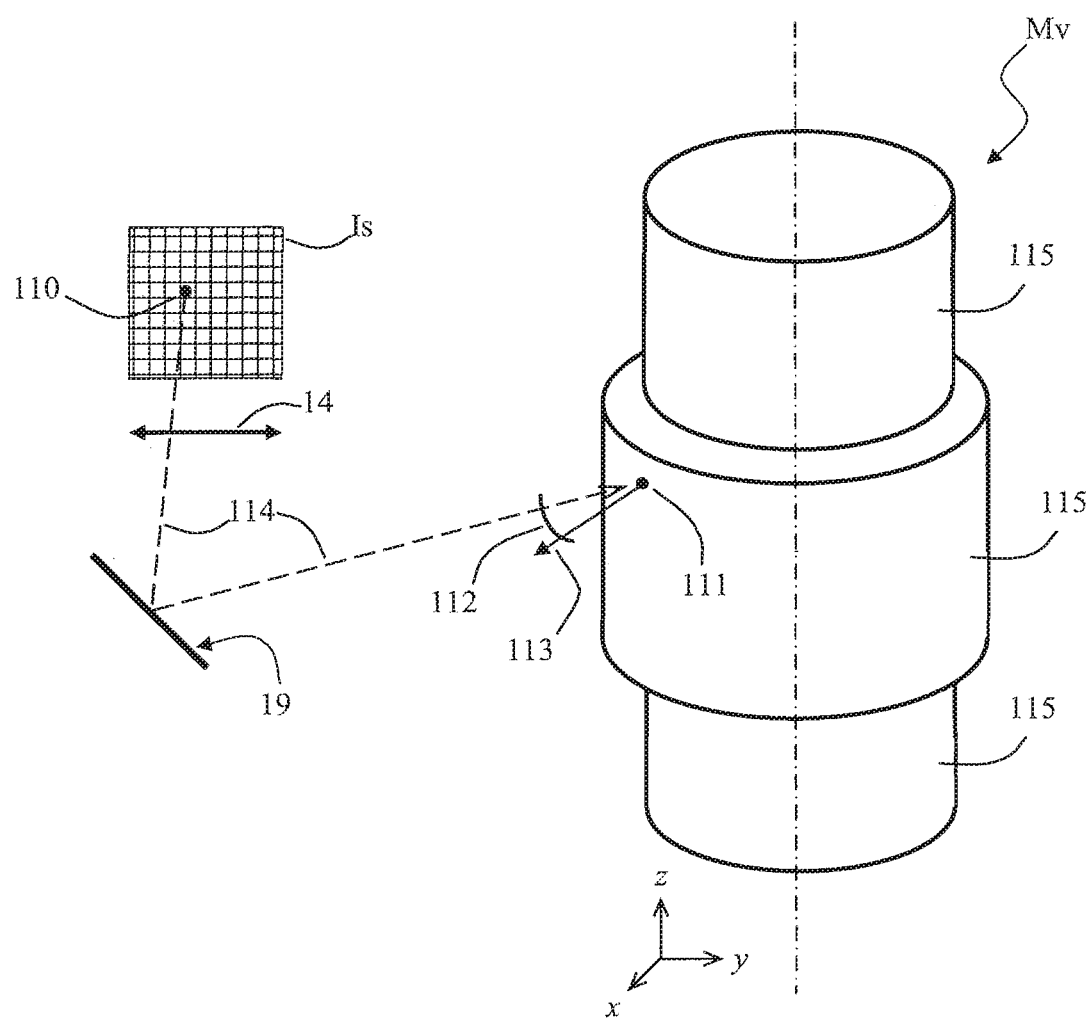
FIG. 8 shows an operation of determining the point of a three-dimensional model that is the image of a pixel of an image taken by the optical device associated with a sensor taking the image.
Figure 9:
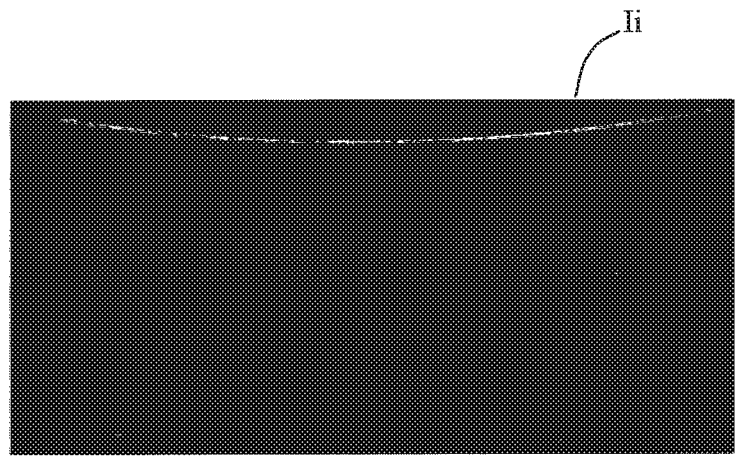
FIGS. 9 to 14 are images obtained by a device as described in the present application.
Figure 10:
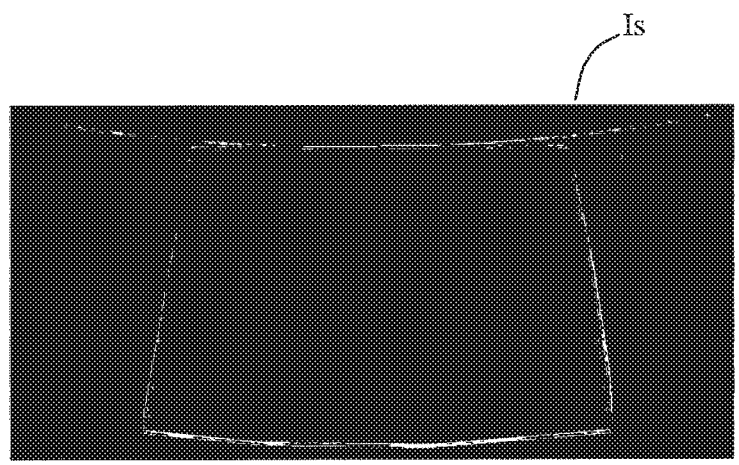
Figure 11:
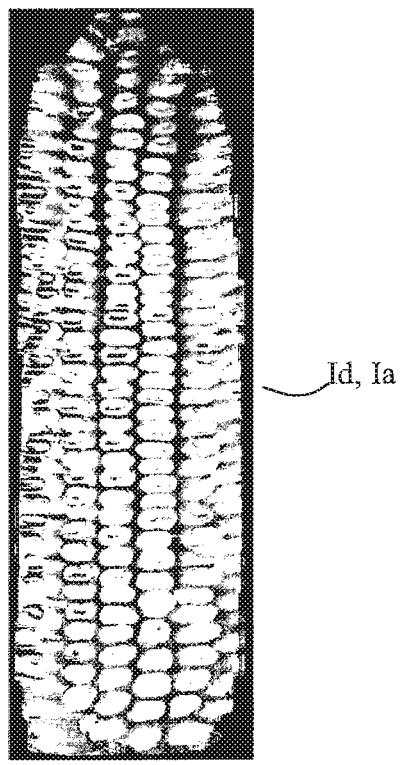
Figure 13:

With reference to FIGS. 6 to 12, after the initial images Ii of neighboring sectors of the outside surface of the ear that overlap partially in pairs have been acquired 100 from a plurality of points of view, by means of the (eight) sensors of the imaging device, the number Ng of kernels of the ear can be determined by the data processor unit 67 performing the following operations:

a) segmenting 101 the initial images Ii (see FIG. 9, for example) in order to conserve a zone of interest in each initial image, so as to obtain a segmented image Is (cf. FIG. 10 for example) for each initial image; this operation may include eliminating the image background, e.g. including the outline of the reflective surface, so as to conserve only the portion of the ear as seen by each sensor, while also determining an outline for that portion;

for each initial image taken by each sensor, this operation may include detecting the left and right edges of the ear or of the slice of ear, and where appropriate modelling those edges with straight-line segments;

b) projecting each segmented ("cut-out") image onto a three-dimensional digital (geometrical) model Mv of the ear, which model is made up of developable surfaces and is linked to the imaging device 10; with projecting comprising the following two operations in succession:

b1) for each pixel 110 of at least a subset of the pixels of the segmented image Is, calculating 106 the coordinates Co of the point 111 of the model Mv that is the image of the pixel taken by the optical device; to do this, and as shown in FIG. 8, the path is traced of a ray 114 coming from the pixel 110, passing through the lens 14 of the sensor, reflected by the surface 19, and terminating on one of the cylindrical surfaces 115 of the model Mv, at the point 111; these coordinates may be the Cartesian coordinates (X, Y, Z) of the point 111 in the Cartesian reference frame (x, y, z) linked to the model. Mv and having one of its axes, e.g. the z axis, that may be caused to coincide with the axis 13;

b2) the segmented image may then be flattened 102 as a function of the coordinates (X, Y, Z) calculated for each pixel of the segmented image, so as to obtain a developed image Id, e.g. the image shown in FIG. 11:

c) assembling together (103) the developed images Id so as to obtain an assembled image Ia, e.g, the image shown in FIG. 13; and d) then determining the number of kernels Ng from the assembled image Ia or from the developed images Id.

The developed images of the ear or of a slice of the ear may be assembled together laterally after selecting a projection plane and a common angular origin for the various images; for protecting flat, the Cartesian coordinates associated with the pixels may be transformed into cylindrical coordinates For each segmented image, and for each pixel of the image, it is possible to calculate a quality indicator for the pixel, which indicator varies as a function of the viewing angle of the point of the model of the plant that is the image of the pixel as seen by the optical device comprising the lens 14 and the mirror 19, and this quality indicator may be used to blend together the overlapping portions of the developed images while they are being assembled together: the values of pixels in image portions that correspond to overlap zones may be weighted by a factor that is proportional to the indicator.

This quality indicator may correspond to the angle of inclination 112 relative to the normal 113 to the surface 115 of the model Mv at the image point 111 of the pixel 110 under consideration, for the ray 114 connecting the image point 111 of the pixel under consideration to the pixel under consideration.

It is thus possible, for each pixel of the developed image, to store the quality indicator together with the red, green, and blue (R, G, and B) magnitudes and the coordinates of the point of the model that is associated with the pixel.

The number of kernels Ng of the ear may be determined from the assembled image Ia for each image of a lateral strip of the ear as obtained by assembling together images taken by one of the sensors, in particular while moving the movable structure of the device.

Alternatively, the number of kernels Ng may be determined from the image that results from all of the images of the ear.

When an image of a complete (longitudinal) lateral strip of the ear can be obtained by taking a single image, the number of kernels Ng can be determined by segmenting the developed images corresponding to the images acquired by the various sensors.

Segmentation of the assembled image or of the developed images is performed in such a manner as to obtain closed outlines, which are the outlines of "candidate" kernels.

Segmentation of the image may include converting the assembled image into black and white, with a local thresholding operation.

In order to determine the number of kernels, it is possible to select from the closed outlines of candidate kernels obtained by segmentation, those that have at least one morphological parameter such as the elongation of the outline, the convexity of the outline, or the area defined by the outline, that satisfies a determined selection criterion, in particular those for which elongation is less than a determined value.

It is then possible to calculate the center of gravity (CG) of each of the selected closed outlines so as subsequently to be capable of eliminating "duplicates", i.e. outlines for which the distances between their respective CGs are small enough to indicate that those outlines have been selected twice over, so as to obtain a more accurate estimate of the number of kernels.

Figure 12:
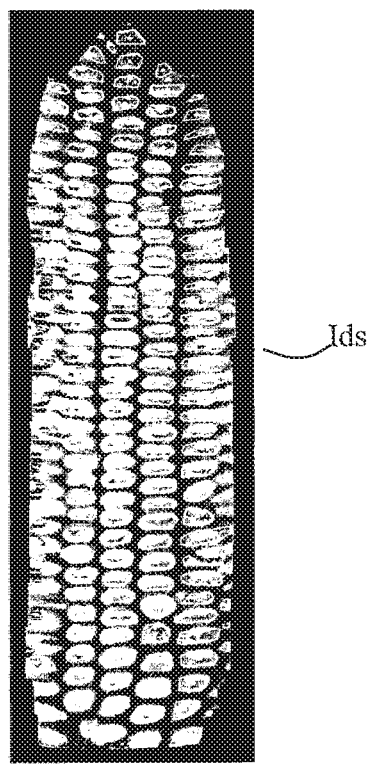
Figure 14:
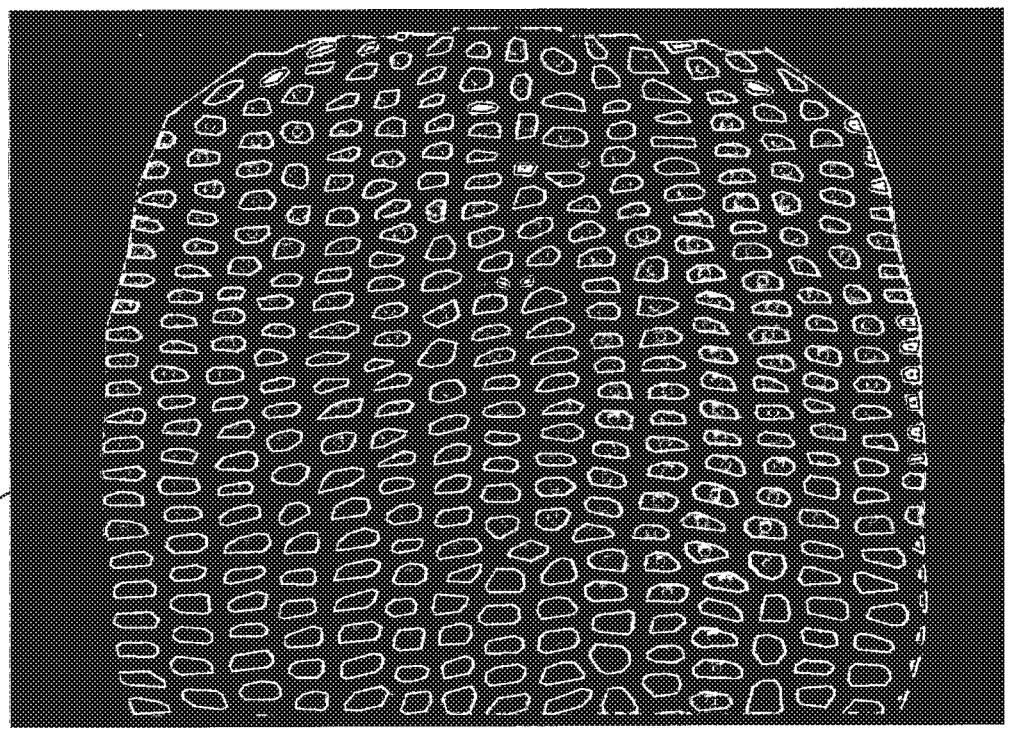

The selected closed outlines and the corresponding CGs may be included in the possibly-assembled projected images Id, Ia as shown in FIGS. 11 and 13 so as to form final segmented images such as those shown respectively in FIGS. 12 and 14.

After assembling the developed surfaces together so as to obtain an image of the entire outside surface of the ear, it is possible to identify "un-pollinated" or "aborted" zones of the outside surface of the ear, i.e. those zones that do not include any closed outlines (of kernels) and that have at least one geometrical or morphological parameter that satisfies some determined criterion, and to calculate the areas of these zones.

Calculating CGs can also serve to determine the number of rows of kernels in the imaged ear.

Figure 7:
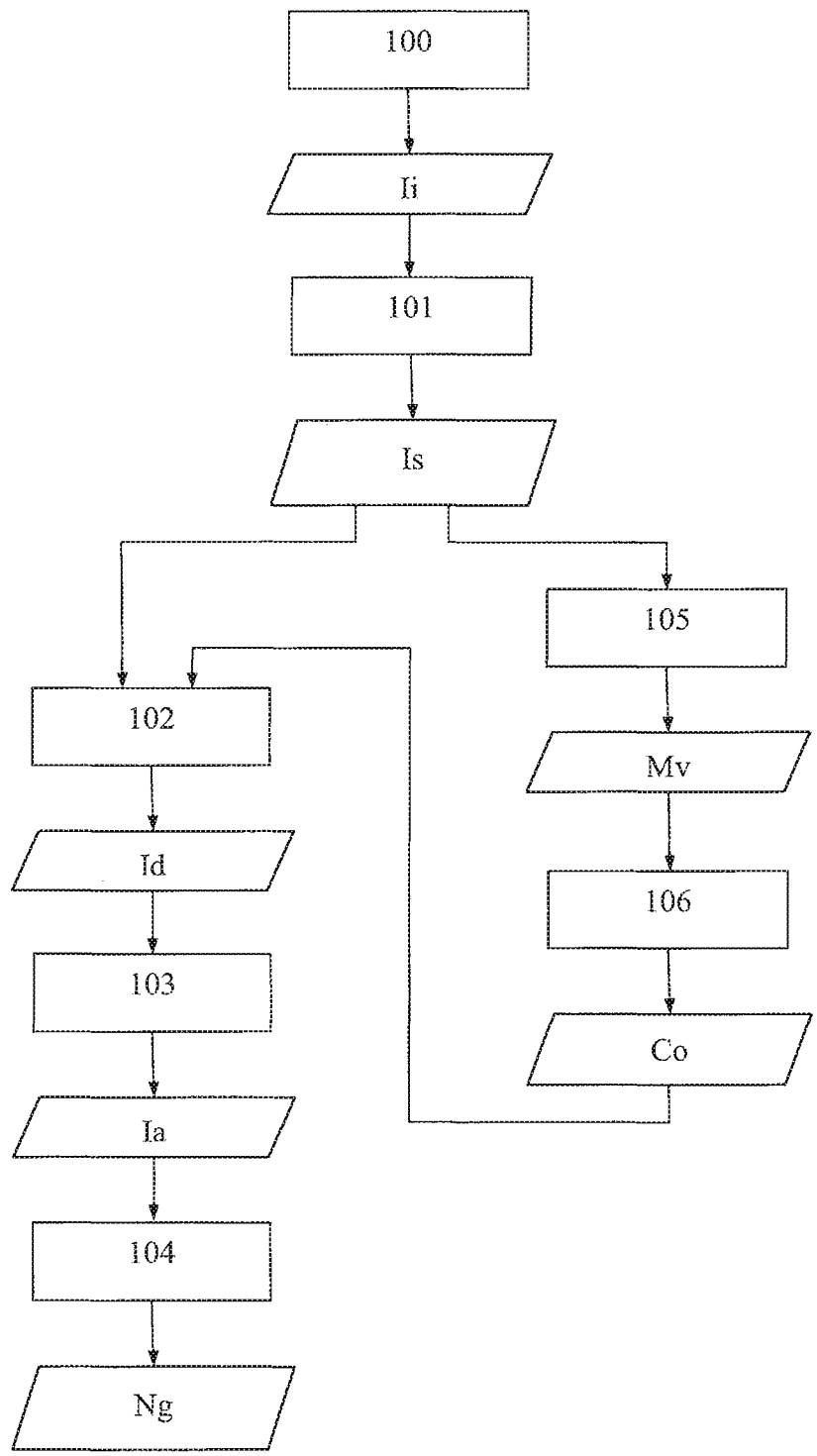

In the embodiment corresponding to FIG. 7, the developable surfaces of the model Mv, in particular cylinders or truncated cones, are determined 105 from segmented images resulting from initial images acquired by a plurality of sensors, and in particular by all of the sensors.

For this purpose, it is possible to cross-reference outline information in the segmented images resulting from initial images acquired by all of the sensors.

For this purpose, for each angular sector of the ear as observed by one of the sensors, and for each pixel of a straight line segment resulting from modelling an edge of the ear, it is possible to determine the point of intersection with a "horizontal" plane (i.e. a plane perpendicular to the axis 13) of a ray reflected by the mirror associated with the sensor and transmitted through the lens of the sensor, terminating at the pixel under consideration; thereafter, the center and the radius are determined of the largest circle in the horizontal plane under consideration that can be inscribed in the cloud of points of intersection as obtained in this way for the images of all of the angular sectors (as acquired by all of the sensors).

In each horizontal plane under consideration, it is then possible to associate an elementary developable surface (in particular a cylindrical surface or a conical surface) with each circle, the coordinates of the center and the radius of this surface corresponding respectively to the coordinates of the center and the radius of the circle.

For horizontal planes that are spaced apart along the axis 13, e.g. for one or more tens of horizontal planes that are substantially regularly spaced apart along this axis, it is thus possible to obtain respective elementary developable surfaces that are adjacent in pairs and that together make up the surface of the model Mv.

This model may be used in particular for calculating the volume of the ear and also the area of the outside surface of the ear.

EXAMPLE of an application of the invention to estimating the number of kernels and the number of rows on ears of maize.

Figure 15:
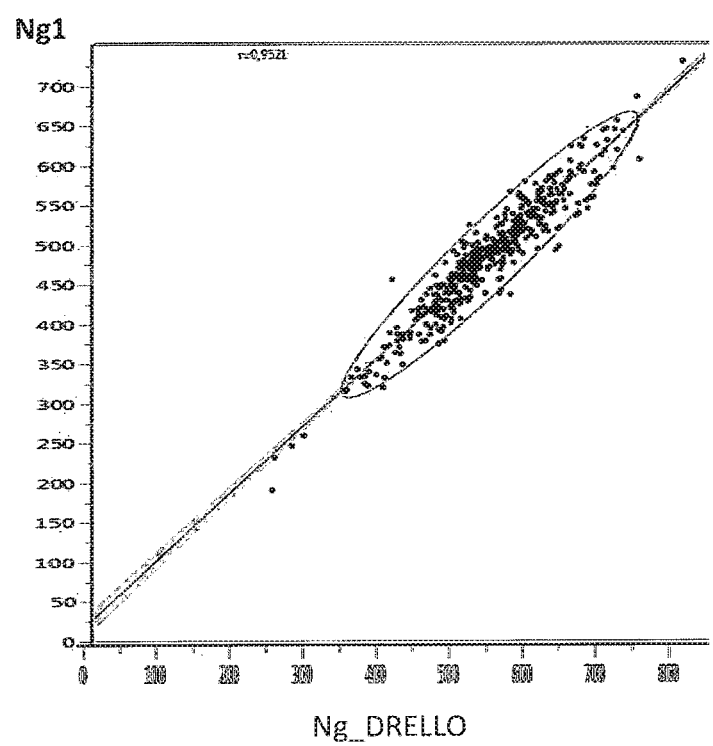
FIGS. 15 and 16 are graphs showing the correlations between the numbers of kernels of an ear of maize as obtained by image processing methods and the numbers of kernels as obtained by manual counting.
Figure 16:
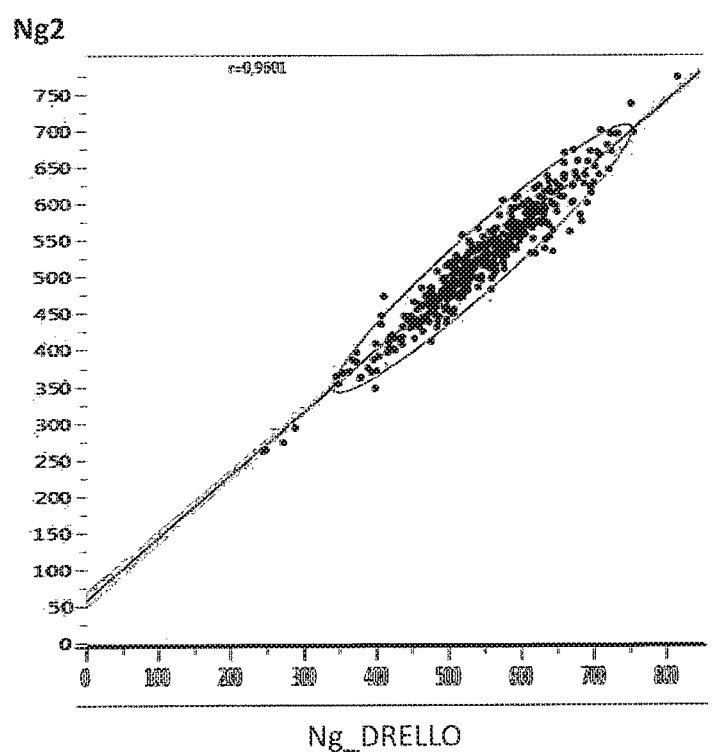

The claimed device was used to take images of 435 mature ears. After being harvested, the number of kernels per ear was measured by using two different methods:

The number Ng1 plotted up the ordinate axis in FIG. 15 corresponds to the number of kernels counted on the image of the reconstituted entire ear, as shown in FIGS. 13 and 14;

The number Ng2 plotted up the ordinate axis in FIG. 16 corresponds to the number of kernels counted from the 8 developed images corresponding to vertical sections of the ear, as shown in FIG. 11; and the number Ng_DRELLO of kernels (plotted along the abscissa axis in FIGS. 15 and 16) for each ear was determined in parallel by counting using an MZB2000 counter from the supplier DRELLO GmbH & Co. KG.

The correlations between the numbers obtained using each of the two methods and the number of kernels obtained using the DRELLO counter can be seen in FIGS. 15 and 16. The correlations are about 0.95 for both methods.

The ellipses drawn in FIGS. 15 and 16 correspond to a density (correlation) of 0.95.

The correlation between the number of rows counted by the described apparatus and method, and the number of rows counted manually, is also significant, EXAMPLE of an application of the invention to estimating the width (diameter) and the length of ears of maize.

On the same population of ears, diameter and length were measured manually using a caliper, and they were compared with the values obtained by the claimed methods and devices.

Figure 17:
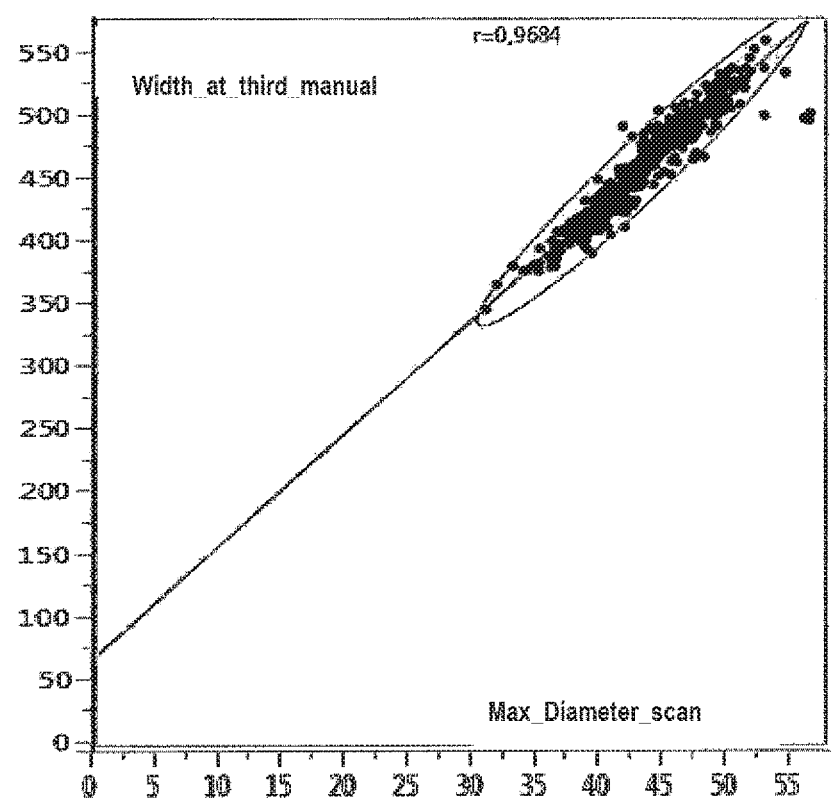
FIGS. 17 and 18 are graphs showing the correlations between the width (FIG. 17) and the length (FIG. 18) of an ear of maize as obtained by the methods and devices described in the present application, and by manual measurements.
Figure 18:
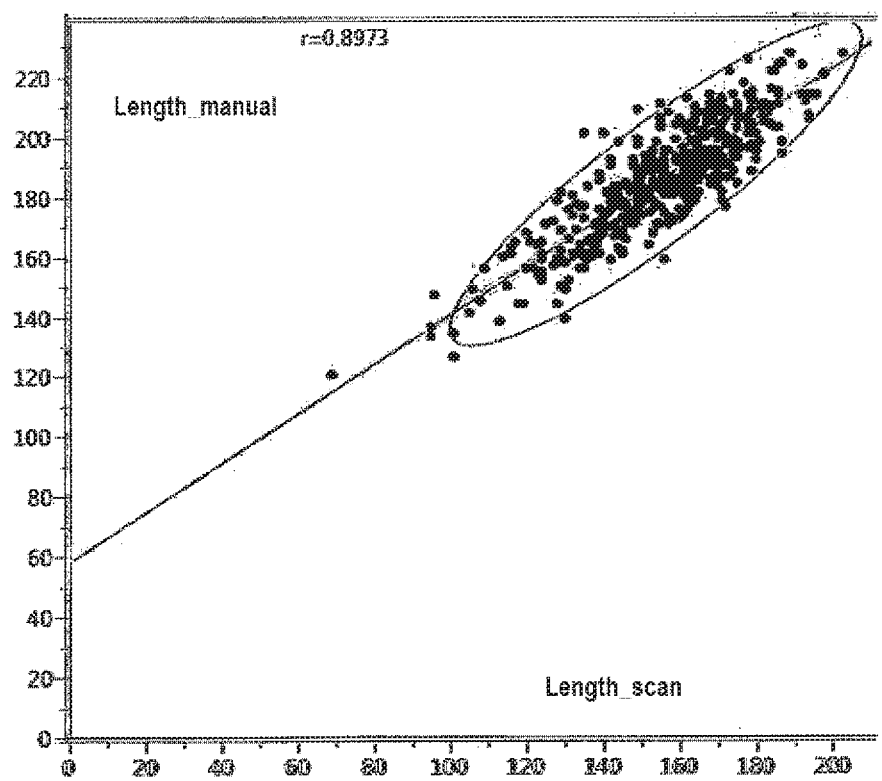

The ellipses drawn in FIGS. 17 and 18 correspond to a density (correlation) of 0.95.

FIG. 17 shows that the correlation between the length of the ears as obtained by the claimed device, as plotted along the abscissa axis, and manual measurements of diameter (plotted up the ordinate axis) is about 0.95. The manual measurements of diameter were taken one third of the way up the ear and starting from the base of the ear.

FIG. 18 shows that the correlation between the length of the ear as obtained by the invention, plotted along the abscissa axis, and the manual measurements, plotted up the ordinate axis, is about 0.9.

The invention claimed is:

1. A method of taking images of a plant, comprising: surrounding a portion to be imaged of the plant with at least one transparent wall forming a window presenting a longitudinal axis and enabling the portion of the plant to be observed through the window;
arranging around the window at least one reflecting surface directed towards the longitudinal axis, and also at least one sensor of images of the plant as reflected by the reflecting surface(s);
capturing a first image of a first peripheral section of the plant as reflected by the reflecting surface(s);
moving the reflecting surface(s) and the image sensor(s) relative to the window along the longitudinal axis;
capturing a second image of a second peripheral section of the plant as reflected by the reflecting surface(s), the first and second peripheral sections overlapping partially; and
forming an image of a peripheral portion of the plant from the first image and from the second image.

2. A method according to claim 1, wherein the number of images taken in succession by the or each image sensor during a complete movement stroke of the reflecting surface (s) and of the image sensor(s) along the window is of the order of one or more tens, the images taken corresponding to the same number of neighboring portions or zones of the outside surface of the plant, these neighboring zones or portions overlapping partially in pairs.

3. A method according to claim 1, wherein first and second images are captured while the reflecting surface(s) and the image sensor(s) are moving, i.e. without interrupting the movement, and wherein the reflecting surface(s) and the image sensor(s) are caused to move at a speed that is substantially constant.

4. A method according to claim 1 wherein during at least a portion of the time first and second images are being taken, the plant is illuminated by a light pulse produced by at least one light source a ratio of a duration between two successive light pulses to a duration of each light pulse being greater than one, and wherein image acquisition is controlled synchronously with the movement of the reflecting surface(s) and of the image sensor(s) along the window.

5. A method according to claim 1, for determining a characteristic (Ng) of the plant, wherein initial images (Ii) are acquired of neighboring zones of the outside surface of the plant, which images are respectively acquired from a plurality of viewpoints by a plurality of sensors of an imaging device including an optical device associated with each sensor, the neighboring zones overlapping partially in pairs; the method comprising the following operations:
a) segmenting the initial images in order to conserve a zone of interest from each initial image, so as to obtain a segmented image (Is) from each initial image;
b) for each segmented image:
b1) for each pixel of at least a subset of pixels of the segmented image, calculating coordinates (Co) of a point of a three-dimensional model (Mv) of the plant made up of developable surfaces, which point is an image of the pixel taken by the optical device;
b2) flattening the segmented image as a function of the coordinates calculated for each pixel of the segmented image so as to obtain a developed image (Id);
c) assembling the developed images so as to obtain an assembled image (Ia); and
d) determining the characteristic (Ng) from the assembled image or from the developed images.

6. A method according to claim 5, wherein assembling together the developed images includes blending together the developed images.

7. A method according to claim 6, wherein for each segmented image, and for each pixel of the segmented image, a quality indicator for the pixel is calculated, which indicator varies as a function of a viewing angle at which the point of the model of the plant that is the image of the pixel is seen by the optical device, and wherein the quality indicator is used for blending together the developed images.

8. A method according to claim 7, wherein the quality indicator corresponds substantially to the angle of inclination relative to the normal to the surface of the model of the point of the pixel under consideration for a ray coming from the image point of the pixel under consideration and terminating at the pixel under consideration.

9. A method according to claim 7 wherein closed outlines are selected from closed outlines obtained by segmentation, the outlines that are selected having at least one morphological parameter such as elongation of the outline, convexity of the outline, or area defined by the outline, that satisfies a determined selection criterion.

10. A method according to claim 5 wherein determining the characteristic (Ng) includes segmenting the assembled image or the developed images so as to obtain closed outlines.

11. A method according to claim 10, wherein the center of gravity of each of the closed outlines is calculated.

12. A device for acquiring images of a plant, the device comprising:
   i) a first structure defining a cavity for receiving a portion to be imaged of the plant, the cavity being elongate along a longitudinal axis and presenting an opening at one of its two longitudinal ends, the cavity being defined by at least one transparent wall forming a window for observing the portion of the plant to be imaged;
   ii) a second structure extending around the window and mounted to move in translation along the longitudinal axis relative to the first structure, the second structure comprising:
      reflective optics extending around the window and including at 1 east one reflecting surface directed towards the longitudinal axis; and
      a plurality of image sensors arranged in a substantially regular distribution around the window each sensor having a field of view including at least a portion of the reflective optics so as to capture images of a sector of the portion of the plant that is surrounded by the window, which images are reflected by the reflective optics; and
   iii) an actuator arranged to drive the second structure to move relative to the first structure along the longitudinal axis.

13. A device according to claim 12, including guide members secured to the first structure and arranged to guide the second structure while it is moving.

14. A device according to claim 12, including a processor unit for processing image data or signals delivered by the image sensors, the processor unit being secured to the first structure, and the device including wired or wireless transmission means for transmitting data or signals from the sensors to the processor unit.

15. A device according to claim 14, wherein the processor unit is programmed to perform a method according to claim 5.

16. A device according to claim 12 wherein the reflective optics include a respective reflecting surface associated with each image sensor, which reflecting surface is convex.

17. A device according to claim 12 wherein the reflective optics include a respective reflecting surface associated with each image sensor, and wherein an intersection between the optical axis of a sensor and the associated reflecting surface coincides substantially with the center of that surface.

18. A device according to claim 13 wherein the or each reflecting surface is inclined relative to the longitudinal axis at an angle of inclination that lies in the range approximately 35 degrees to approximately 40 degrees.

19. A device according to claim 12 wherein the or each reflecting surface is inclined relative to the longitudinal axis at an angle of inclination that lies in the range approximately 50 degrees to approximately 55 degrees.

20. A device according to claim 12 including a first screen extending around the reflective optics so as to form a background for the image sensors.

21. A device according to claim 12 including a second screen extending around the window, from the image sensors that extend around the screen, and along the window over a length that is less than a distance between a sensor and the reflecting surface associated with the sensor, the second screen being secured to the second structure, so as to reduce interfering light that propagates towards the image sensors.

22. A device according to claim 12 including at least one light source associated with each image sensor, which light source is secured to the second structure and is arranged to produce light flux directed towards a reflecting surface associated with the sensor, the light flux propagating substantially parallel to the optical axis of the image sensor and/or substantially parallel to the longitudinal axis.

* * * * *